(12) United States Patent
Tanabe et al.

(10) Patent No.: US 7,045,379 B2
(45) Date of Patent: May 16, 2006

(54) METHOD OF MANUFACTURING SURFACE SHAPE RECOGNITION SENSOR

(75) Inventors: Yasuyuki Tanabe, Kanagawa (JP); Katsuyuki Machida, Kanagawa (JP); Hakaru Kyuragi, Tokyo (JP); Tetsuya Oonishi, Osaka (JP); Toshihiko Kumazaki, Tokyo (JP)

(73) Assignees: Nippon Telegraph and Telephone Corporation, Tokyo (JP); Sharp Kabushiki Kaisha, Osaka (JP); NTT Electronics Corporation, Tokyo (JP)

( * ) Notice: Subject to any disclaimer, the term of this patent is extended or adjusted under 35 U.S.C. 154(b) by 4 days.

(21) Appl. No.: 10/385,532

(22) Filed: Mar. 11, 2003

(65) Prior Publication Data

US 2003/0203543 A1    Oct. 30, 2003

(30) Foreign Application Priority Data

Mar. 15, 2002    (JP)    ............................... 2002-071421

(51) Int. Cl.
*H01L 21/44*    (2006.01)
(52) U.S. Cl. .................. 438/48; 438/622; 438/672
(58) Field of Classification Search .................. 438/48, 438/56, 57, 73, 622, 672, 63, 64; 257/414, 257/428, 448, 444, 225, 252; 382/124; 324/686, 324/688
See application file for complete search history.

(56) References Cited

U.S. PATENT DOCUMENTS

| | | | |
|---|---|---|---|
| 6,240,199 B1 * | 5/2001 | Manchanda et al. | 382/124 |
| 6,248,655 B1 * | 6/2001 | Machida et al. | 438/597 |
| 6,555,888 B1 * | 4/2003 | Lepert et al. | 257/415 |
| 6,714,666 B1 * | 3/2004 | Morimura et al. | 382/124 |

(Continued)

FOREIGN PATENT DOCUMENTS

JP    61-221883 A    10/1986

(Continued)

OTHER PUBLICATIONS

Yoshimasa Shimizu et al., "A Study on the Structure of a Smart Card with the Function to Verify the Holder", Technical Report of IEICE, OFS92-32, pp. 25-30 (1992).

(Continued)

*Primary Examiner*—Kenneth Parker
*Assistant Examiner*—Matthew C Landau
(74) *Attorney, Agent, or Firm*—Blakely Sokoloff Taylor & Zafman

(57) ABSTRACT

In a method of manufacturing a surface shape recognition sensor, first and second interconnections are formed on a semiconductor substrate. An interlayer dielectric film on the semiconductor substrate covers the interconnections. A first metal film is electrically connected to the interconnections through first and second through holes in the interlayer dielectric film. A first mask pattern on the first metal film covers predetermined first and second regions corresponding to the through holes, respectively. The exposed first metal film is selectively removed to form a sensor electrode and connection electrode film, formed of the first metal film, in the first and second regions, respectively. An insulating passivation film on the interlayer dielectric film covers the sensor electrode and connection electrode film. A third through hole in the passivation film reaches the connection electrode film. A second metal film on the passivation film is in contact with the exposed connection electrode film. A second mask pattern on the second metal film has a pattern portion on a predetermined region. The second metal film is selectively removed using the second mask pattern as a mask to form a ground electrode connected to the second interconnection through the connection electrode film.

11 Claims, 4 Drawing Sheets

U.S. PATENT DOCUMENTS

2001/0023086 A1 * 9/2001 Park et al. .................... 438/57

FOREIGN PATENT DOCUMENTS

| JP | 05-061965 A | 3/1993 |
|---|---|---|
| JP | 07-168930 A | 7/1995 |
| JP | 2000-230801 | 8/2000 |
| JP | 2000-266506 | 9/2000 |
| JP | 2001-120519 | 5/2001 |

OTHER PUBLICATIONS

Marco Tartagni et al., "A 390dpi Live Fingerprint Imager Based on Feedback Capacitive Sensing Scheme", 1997 IEEE International Solid-State Circuits Conference, pp. 200-201 (1997).

* cited by examiner

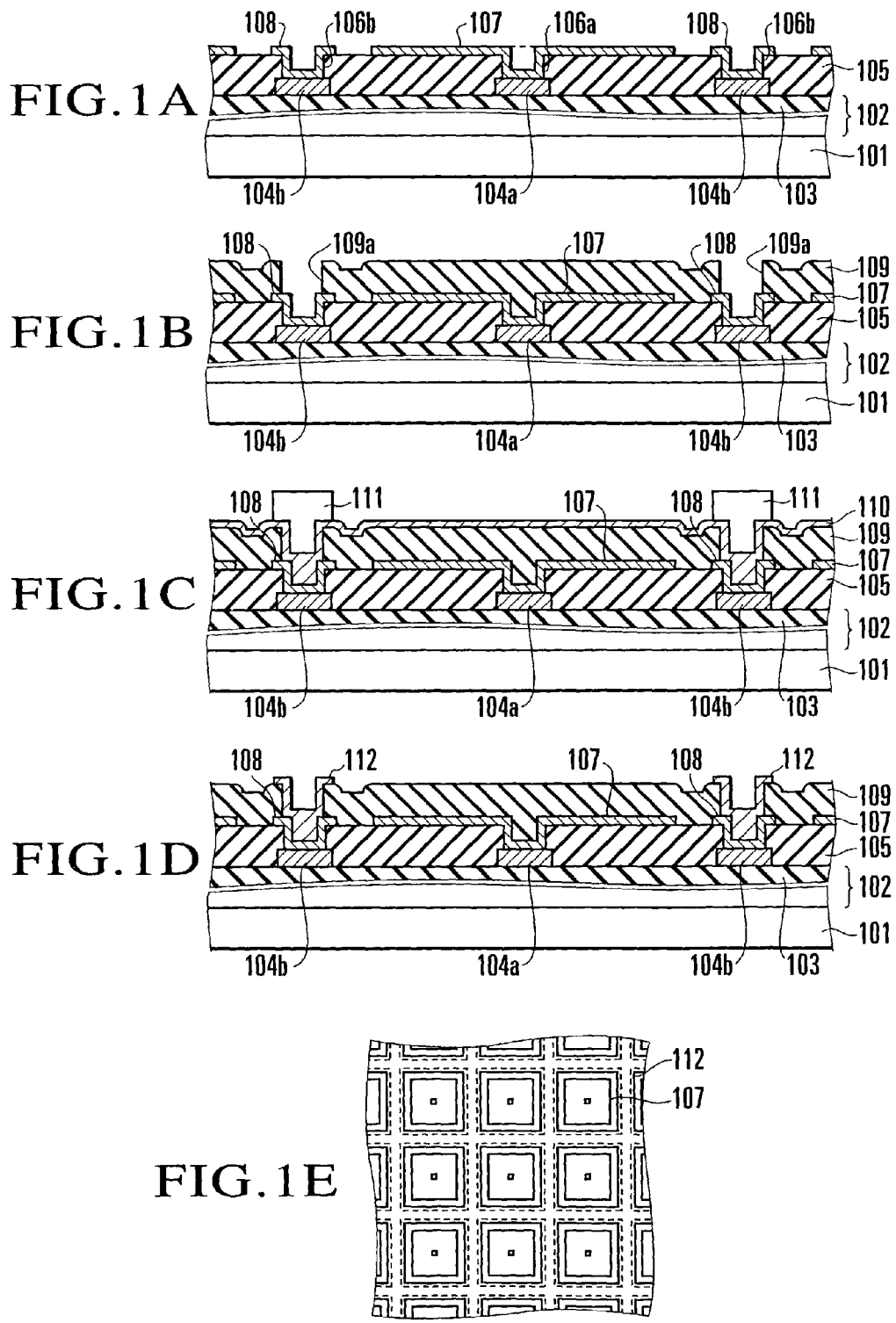

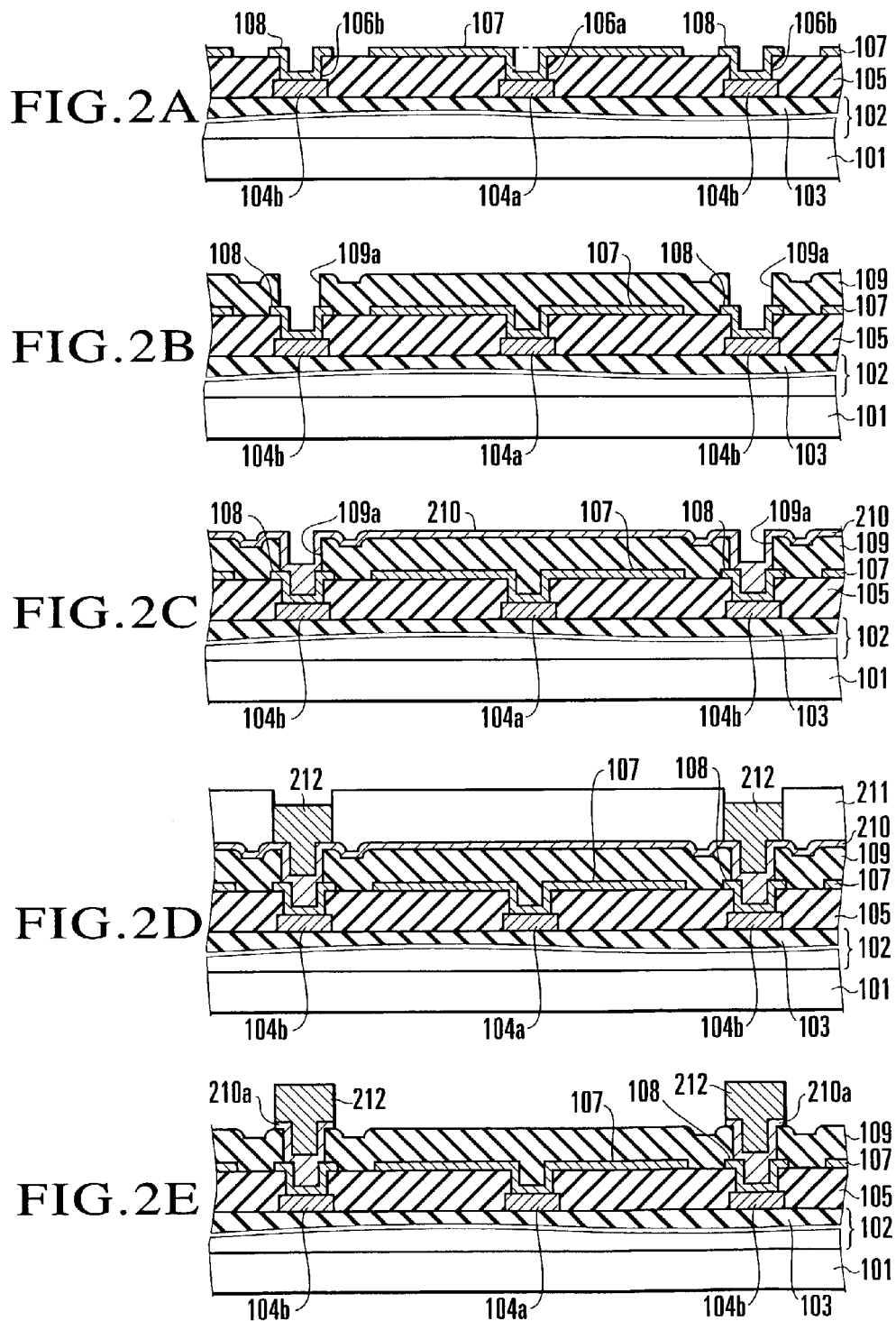

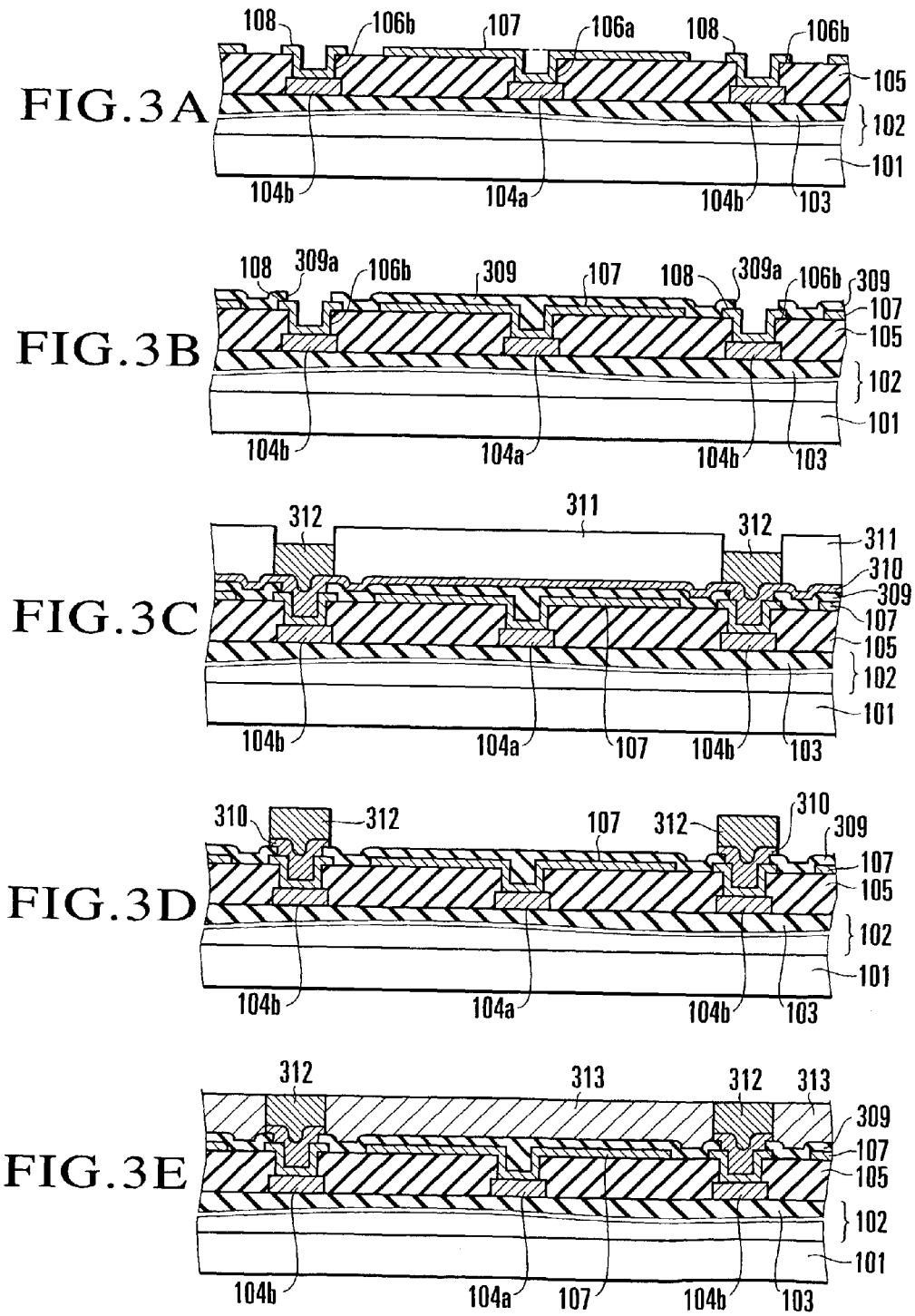

METHOD OF MANUFACTURING SURFACE SHAPE RECOGNITION SENSOR

BACKGROUND OF THE INVENTION

The present invention relates to a method of manufacturing a surface shape recognition sensor and, more particularly, to a method of manufacturing a surface shape recognition sensor that senses a fine three-dimensional pattern such as a human fingerprint or an animal muzzle pattern.

Concern for the security technique has been increasing in the recent social environment along with the development of the information-oriented society. For example, in the information-oriented society, a holder verification technique for constructing a system such as an electronic cashing system has become an important key. Also, studies and developments have become active on the verification technique which prevents a robbery or illegal use of a card (for example, Yoshimasa Shimizu et al., "A Study on the Structure of a Smart Card with the Function to Verify the Holder", Technical Report of IEICE, OFS92-32, pp. 25–30 (1992).

The verification scheme for preventing illegal use includes various types that utilize a fingerprint or voiceprint. Among them, many technical developments have been made on the fingerprint verification technique. The scheme of detecting the shape of the fingerprint when verifying the fingerprint is roughly divided into an optical reading scheme and a scheme of detecting the three-dimensional pattern of the skin surface of the human fingertip by converting it into electrical signals.

According to the optical reading scheme, the fingerprint is input as optical image data and is collated by mainly using light reflection and a CCD image sensor (Japanese Patent Laid-Open No. 61-221883). As another scheme, one that utilizes a piezoelectric thin film in order to read the pressure difference of the fingerprint has also been developed (Japanese Patent Laid-Open No. 5-61965). Similarly, as a scheme that detects the shape of the fingerprint by converting a change in electric characteristics caused by contact with the skin surface into the distribution of electrical signals, a scheme that detects a resistance change amount or capacitance change amount using a pressure-sensitive sheet has been proposed (Japanese Patent Laid-Open No. 7-168930).

Of the techniques described above, however, the scheme that uses light is difficult in downsizing and versatile applications, so that its application is limited. The method that senses the three-dimensional pattern of the finger by using a pressure-sensitive sheet or the like is difficult in practical use because the material is specific and the sheet is difficult to process. Hence, this scheme may lack reliability.

A capacitive fingerprint sensor has been developed which is fabricated by using the LSI manufacturing technique (Marco Tartagni and Roberto Guerrieri, "A 390 dpi Live Fingerprint Imager Based on Feedback Capacitive Sensing Scheme", 1997 IEEE International Solid-State Circuits Conference, pp. 200–201 (1997)). According to this sensor, the three-dimensional pattern of the skin surface is detected with small sensors arrayed two-dimensionally on an LSI chip by utilizing the feedback electrostatic capacitive scheme.

In the capacitive sensor, two plates are formed on the uppermost layer of the LSI interconnection, and a passivation film is formed on the plates. When a fingertip comes into contact with this sensor, the skin surface serves as the third plate, and the three-dimensional pattern on the skin surface is isolated by an insulating layer comprised of air. Hence, the fingerprint is detected by sensing the capacitances that differ from one sensor to another depending on the difference in distance from the sensor surface. As compared to a conventional optical-scheme sensor, this structure needs no specific interface and can be downsized as its characteristic features.

The fingerprint sensor is in principle obtained by forming a plurality of sensor electrodes on a semiconductor substrate to form a matrix, and forming a passivation film on the sensor electrodes. The capacitance between the skin surface and the sensor is detected through the passivation film, thus detecting the fine three-dimensional pattern.

This conventional capacitive fingerprint sensor will be briefly described with reference to the accompanying drawings. As shown in FIG. 4A, this fingerprint sensor has interconnections 403 on a semiconductor substrate 401 with LSIs or the like through a lower insulating film 402, and an interlayer dielectric film 404 on the interconnections 403.

Sensor electrodes 406 having, e.g., a rectangular planar shape, are formed on the interlayer dielectric film 404. The sensor electrodes 406 are connected to the interconnections 403 through plugs 405 in through holes formed in the interlayer dielectric film 404. A passivation film 407 is formed on the interlayer dielectric film 404 to cover the sensor electrodes 406, thus forming sensor elements. The plurality of sensor elements with the above arrangement are two-dimensionally arranged such that the sensor electrodes 406 of the adjacent sensor elements do not in contact with each other, as shown in FIG. 4B.

The operation of this capacitive sensor will be described. In fingerprint detection, a finger as the fingerprint detection target comes into contact with the passivation film 407. When the finger comes in contact with the surface of the passivation film 407, on the sensor electrodes 406, the skin surface that has come into contact with the passivation film 407 serves as an electrode, and forms a capacitance with the sensor electrodes 406. This capacitance is detected by a detector (not shown) through the interconnections 403. As the fingerprint on the fingertip is formed of the three-dimensional pattern of the skin surface, when the finger comes into contact with the passivation film 407, the distance between the skin surface as the electrode and the sensor electrodes 406 differs between projections and recesses that form the fingerprint.

This difference in distance is detected as a difference in capacitance. Therefore, when the distribution of the different capacitances is detected, it corresponds to the shape of the projections of the fingerprint. Namely, this capacitive sensor can sense the fine three-dimensional pattern of the skin surface.

As compared to a conventional optical-scheme sensor, the capacitive fingerprint sensor requires no specific interface and can be downsized.

The capacitive sensor described above can be simultaneously mounted on, e.g., the following integrated circuit (LSI) chip. For example, the capacitive sensor described above can be simultaneously mounted on an integrated circuit chip where a storage which stores fingerprint data for collation and a recognition processor which compares and collates the fingerprint data prepared in the storage and a read fingerprint are integrated. In this manner, when the capacitive sensor is formed on one integrated circuit chip, information temper or the like in data transfer among different units becomes difficult, and the performance of information secrecy can be improved.

In the sensor described above, however, as the skin surface is utilized as the electrode, the LSI which is mounted simultaneously is likely to cause electrostatic breakdown due to static electricity produced during contact. Hence, conventionally, a sensor, for which the stability, sensitivity, reliability, and the like are considered and furthermore downsizing and versatility are considered and which senses a fine three-dimensional pattern such as a human fingerprint or animal muzzle pattern, and a method of manufacturing the same have been sought for.

SUMMARY OF THE INVENTION

It is an object of the present invention to enable detection of a surface shape stably with a high sensitivity and reliability such that electrostatic breakdown will not occur by static electricity produced during sensing.

In order to achieve the above object, according to the present invention, there is provided a method of manufacturing a surface shape recognition sensor, comprising the steps of forming first and second interconnections on a semiconductor substrate, forming an interlayer dielectric film on the semiconductor substrate to cover the first and second interconnections, forming a first metal film to be electrically connected to the first and second interconnections through first and second through holes formed in the interlayer dielectric film, forming a first mask pattern on the first metal film to cover predetermined first and second regions corresponding to openings of the first and second through holes, respectively, selectively removing the first metal film exposed to a bottom of the opening of the first mask pattern to form, in the first region, a sensor electrode formed of the first metal film connected to the first interconnection and, in the second region, a connection electrode film formed of the first metal film connected to the second interconnection, forming a passivation film made of an insulating material on the interlayer dielectric film to cover the sensor electrode and the connection electrode film, forming a third through hole in the passivation film to reach the connection electrode film, forming a second metal film on the passivation film to be in contact with the connection electrode film exposed to a bottom of the third through hole, forming, on the second metal film, a second mask pattern having a pattern portion on a predetermined region including the third through hole excluding a region corresponding to the sensor electrode, and selectively removing the second metal film using the second mask pattern as a mask to form a ground electrode to be connected to the second interconnection through the connection electrode film.

BRIEF DESCRIPTION OF THE DRAWINGS

FIGS. 1A to 1E are sectional views schematically showing the arrangement of part of a surface shape recognition sensor as part of a method of manufacturing a surface shape recognition sensor according to an embodiment of the present invention;

FIGS. 2A to 2E are sectional views schematically showing the arrangement of part of a surface shape recognition sensor as part of a method of manufacturing a surface shape recognition sensor according to another embodiment of the present invention;

FIGS. 3A to 3E are sectional views schematically showing the arrangement of part of a surface shape recognition sensor as part of a method of manufacturing a surface shape recognition sensor according to still another embodiment of the present invention.

DESCRIPTION OF THE PREFERRED EMBODIMENTS

Figure 4A:
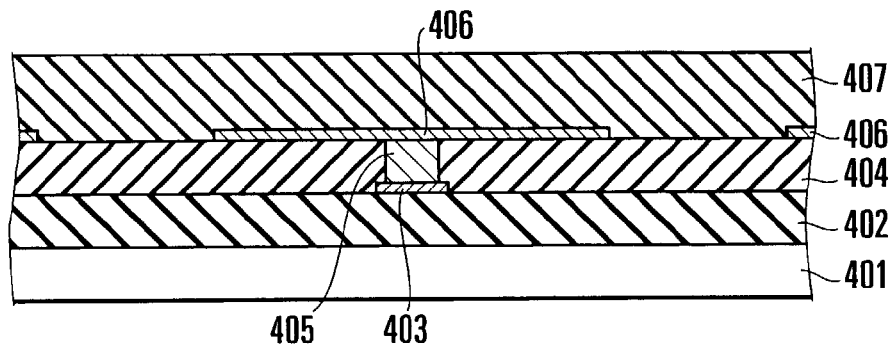
FIGS. 4A and 4B are a sectional view and a plan view, respectively, showing part of the schematic arrangement of a conventional surface shape recognition sensor.

The embodiments of the present invention will be described with reference to the accompanying drawings.

First Embodiment

A method of manufacturing a surface shape recognition sensor according to the first embodiment will be described with reference to FIGS. 1A to 1E. FIGS. 1A to 1E describe the manufacturing method of the present invention. As shown in FIG. 1A, in the surface shape recognition sensor, a multilevel interconnection layer 102 is formed on a semiconductor substrate 101 made of, e.g., silicon. The uppermost layer of the multilevel interconnection layer 102 is covered by an insulating film 103. The multilevel interconnection layer 102 is formed of a plurality of elements (not shown) such as MOS transistors, a plurality of interconnections for connecting the elements, and the like, and forms sensor circuits and the like.

Interconnections 104a and 104b are formed on the semiconductor substrate 101 with integrated circuits thus formed, to be connected to the integrated circuits. The interconnections 104a and 104b are formed by forming an aluminum film on the insulating film 103 and patterning the aluminum film by the known photolithography technique and etching technique. After the interconnections 104a and 104b are formed in this manner, an interlayer dielectric film 105 is formed on the insulating film 103 to cover the interconnections by, e.g., CVD.

Subsequently, the resultant structure is patterned by the known photolithography technique and etching technique, so that through holes 106a and 106b that reach predetermined portions on the interconnections 104a and 104b are formed in the interlayer dielectric film 105. After that, a metal film made of TiW is formed by sputtering on the interlayer dielectric film 105 including the surfaces of the interconnections 104a and 104b exposed to the bottoms of the through holes 106a and 106b.

Subsequently, the metal film is patterned by the known photolithography technique and etching technique, to form sensor electrodes 107 and connection electrode films 108. For example, a resist pattern is formed on the prospective sensor electrode 107 regions and the prospective connection electrode film 108 regions on the 0.2 -μm thick metal film. The metal film is selectively etched by dry etching such as, e.g., reactive ion etching, using the resist pattern as a mask. Thus, the sensor electrodes 107 and connection electrode films 108 can be formed.

The material of the metal film is not limited to TiW, but any material can be used, e.g., a conductive material such as Ti, TiN, or Cr, or a material as a combination of them, as far as it is a conductive material that can form a thin film which is uniform in a wide range.

As shown in FIG. 1B, a passivation film 109 is formed on the interlayer dielectric film 105 to cover the sensor electrodes 107 and connection electrode films 108. The passivation film 109 may be formed by depositing silicon nitride to a thickness of about 1 μm by, e.g., plasma CVD. After the passivation film 109 is deposited, through holes 109a that extend through the passivation film 109 and reach the connection electrode films 108 are formed at predetermined portions on the connection electrode films 108.

As shown in FIG. 1C, a metal film 110 made of Ti/TiN is formed on the passivation film 109 including the interiors of the through holes 109a by sputtering. The metal film 110 has a lower Ti film with a thickness of 0.1 μm and an upper TiN film with a thickness of about 0.05 μm. Subsequently, a resist pattern 111 having a grid-like planar shape, in which the sensor electrodes 107 are arranged at the centers of the respective cells, is so formed as to bridge the regions on the connection electrode films 108.

After that, using the resist pattern 111 as a mask, the metal film 110 is selectively etched by dry etching such as reactive ion etching, so that the resist pattern 111 is removed. As a result, as shown in FIG. 1D, a ground electrode 112 is formed such that it is partly exposed to the surface of the passivation film 109. The ground electrode 112 is connected to ground of the underlying integrated circuits through the interconnections 104b. For example, when a finger comes into contact with the ground electrode 112, static electricity generated on the surface of the passivation film 109 can be discharged to ground.

As described above, according to this embodiment, the sensor electrodes 107 and ground electrodes 112 can be formed such that they are connected to the integrated circuits, e.g., sensor circuits, formed on the semiconductor substrate 101 through the interconnections, or successively after the integrated circuits are manufactured.

As shown in FIG. 1E, the ground electrode 112 is a structure having a grid-like planar shape in which the sensor electrodes 107 are arranged at the centers of the cells. In the ground electrode 112, for example, the inside of each cell forms a substantial square with sides each being about 100-μm long. The sensor electrode 107 arranged at the center of each cell is a square with sides each being, e.g., about 80-μm long.

300×300 sensor electrodes 107 are arranged in a matrix to form the detection surface of the sensor chip. The sensor circuits are formed under the insulating film 103 and on the semiconductor substrate 101, as described above, to detect the capacitances formed in the corresponding sensor electrodes 107. For example, the sensor circuits are prepared for the individual sensor electrodes 107. Outputs from the respective sensor circuits are processed by a processing means (not shown) including other circuits. The capacitances formed in the respective sensor electrodes 107 are output as image data indicating different densities.

In the above description, the ground electrode 112 has a grid-like shape, but the present invention is not limited to this. The ground electrode 112 may form separate portions on the surface of the passivation film 109, e.g., on one side of the circumference of each sensor electrode 107. Even when the ground electrode 112 has separate portions on the surface of the passivation film 109, the separate portions of the ground electrode 112 are connected to each other through interconnections such as the interconnections 104b, so that the whole ground electrode 112 has the same potential.

The ground electrode 112 may be formed for each one of the plurality of sensor electrodes 107. As in this embodiment, if the ground electrode 112 is formed like a grid and the sensor electrodes 107 are arranged at the centers of the respective cells, the distances between the respective sensor electrodes 107 and the ground electrode 112 become equal. The metal film 110 need not be made of Ti/TiN, but any material can be used, e.g., a conductive material such as TiW, Ti, TiN, or Cr, or a material as a combination of them (composite film), as far as it is a conductive material that can form a thin film which is uniform in a wide range.

Second Embodiment

Another embodiment of the present invention will be described.

As shown in FIG. 2A, interconnections 104a and 104b are formed on a semiconductor substrate 101 having a multilevel interconnection layer 102 and made of silicon. The uppermost layer of the multilevel interconnection layer 102 is covered by an insulating film 103. The multilevel interconnection layer 102 is formed of a plurality of elements (not shown) such as MOS transistors, a plurality of interconnections for connecting the elements, and the like, and forms sensor circuits and the like.

The interconnections 104a and 104b are to be connected to the sensor circuits, and are formed by forming an aluminum film on the insulating film 103 and patterning the aluminum film by the known photolithography technique and etching technique. After the interconnections 104a and 104b are formed in this manner, an interlayer dielectric film 105 is formed on the insulating film 103 to cover the interconnections by, e.g., CVD.

Subsequently, the resultant structure is patterned by the known photolithography technique and etching technique, so that through holes 106a and 106b that reach predetermined portions on the interconnections 104a and 104b are formed in the interlayer dielectric film 105. After that, a metal film made of TiW is formed by sputtering on the interlayer dielectric film 105 including the surfaces of the interconnections 104a and 104b exposed to the bottoms of the through holes 106a and 106b.

Subsequently, the metal film is patterned by the known photolithography technique and etching technique, to form sensor electrodes 107 and connection electrode films 108. For example, a resist pattern is formed on the prospective sensor electrode 107 regions and the prospective connection electrode film 108 regions on the 0.2-μm thick metal film. The metal film is selectively etched by dry etching such as, e.g., reactive ion etching, using the resist pattern as a mask. Thus, the sensor electrodes 107 and connection electrode films 108 can be formed. The material of the metal film is not limited to TiW, but a conductive material such as Ti, TiN, or Cr, or a material as a combination of them can be used to form the metal film.

As shown in FIG. 2B, a passivation film 109 is formed on the interlayer dielectric film 105 to cover the sensor electrodes 107 and connection electrode films 108. The passivation film 109 may be formed by depositing silicon nitride to a thickness of about 1 μm by, e.g., plasma CVD. After the passivation film 109 is deposited, through holes 109a that extend through the passivation film 109 and reach the connection electrode films 108 are formed at predetermined portions on the connection electrode films 108. This process is the same as in the method of manufacturing the surface shape recognition sensor described with reference to FIGS. 1A to 1E.

As shown in FIG. 2C, a metal film 210 made of Cr/Au is formed on the passivation film 109 including the interiors of the through holes 109a by, e.g., vapor deposition. The metal film 210 has a lower Cr film with a thickness of 0.1 μm and an upper Au film with a thickness of about 0.1 μm. If the Au film is directly formed on the passivation film 109, very high adhesion properties cannot be obtained. The Cr film is a material that has high adhesion properties with respect to the passivation film 109 and a gold film.

Therefore, when the Cr film is interposed, the Au film can be formed on the passivation film 109 in a stable state. The presence of the Cr film can suppress diffusion of Au. In place of Cr, a metal, e.g., Ti or Ni, that can suppress diffusion of Au and has good adhesion properties with respect to the passivation film and Au may be used.

The connection electrode films 108 described above are made of a conductive material such as TiW, Ti, TiN, or Cr. These materials can suppress mutual diffusion of Au and the like. When a material that can suppress mutual diffusion is used to form the connection electrode films 108, diffusion of Au can be more suppressed.

As shown in FIG. 2D, a resist pattern 211 having a grid-like surface shape (opening), in which the sensor electrodes 107 are arranged at the centers of the respective cells, is formed by the known photolithography technique. The resist pattern 211 is formed to a thickness of about 5 µm. Subsequently, Au is grown for about 1 µm by electrolytic plating on the surface of the metal film 210 exposed to the groove bottom of the resist pattern 211, to form an electrode column 212. Alternatively, an electrode column may be formed by plating copper. The technique for forming the electrode column 212 is not limited to electrolytic plating, but gold or copper may be grown by electroless plating to form the electrode column 212. After the electrode column 212 is formed, the resist pattern 211 is removed.

After the resist pattern 211 is removed, as shown in FIG. 2E, the metal film 210 is selectively etched using the electrode column 212 as a mask. To etch the metal film 210, first, the upper Au film is removed by a wet process using an aqueous solution mixture containing iodine, ammonium iodide, and ethanol as an etching solution. Subsequently, the lower Cr film is removed by a wet process using an aqueous solution of potassium ferricyanide and sodium hydroxide as an etching solution.

As the consequence of these etching processes, a ground electrode formed of that part of the metal film 210 which is left by etching and the electrode column 212 is formed on the passivation film 109. The ground electrode 112 is connected to ground of the underlying integrated circuits through the interconnections 104b. For example, when, e.g., a finger comes into contact with the ground electrode 112, static electricity generated on the surface of the passivation film 109 can be discharged to ground.

As described above, according to this embodiment, the sensor electrodes 107 are formed such that they are connected to the integrated circuits, e.g., sensor circuits, formed on the semiconductor substrate 101 through the interconnections, or successively after the integrated circuits are manufactured.

The ground electrode 112 is a structure having a grid-like planar shape in which the sensor electrodes 107 are arranged at the centers of the cells. In the ground electrode 212, for example, the inside of each cell forms a substantial square with sides each being about 100-µm long. The sensor electrode 107 arranged at the center of each cell is a square with sides each being, e.g., 80-µm long.

300×300 sensor electrodes 107 are arranged in a matrix to form the detection surface of the sensor chip.

The ground electrode 212 is not limited to a grid-like one, but may form separate portions on the surface of the passivation film 109, e.g., on one side of the circumference of each sensor electrode 107. Even when the ground electrode 212 has separate portions on the surface of the passivation film 109, the separate portions of the ground electrode 212 are connected to each other through interconnections such as the interconnections 104b, so the whole ground electrode 212 has the same potential.

The ground electrode 212 may be formed for each one of the plurality of sensor electrodes 107. If the ground electrode 212 is formed like a grid and the sensor electrodes 107 are arranged at the centers of the respective cells, the distances between the respective sensor electrodes and the ground electrode 112 become equal.

Third Embodiment

Still another embodiment of the present invention will be described.

As shown in FIG. 3A, interconnections 104a and 104b are formed on a semiconductor substrate 101 having a multilevel interconnection layer 102 and made of silicon. The uppermost layer of the multilevel interconnection layer 102 is covered by an insulating film 103. The multilevel interconnection layer 102 is formed of a plurality of elements (not shown) such as MOS transistors, a plurality of interconnections for connecting the elements, and the like, and forms sensor circuits and the like.

The interconnections 104a and 104b are to be connected to the sensor circuits, and are formed by forming an aluminum film on the insulating film 103 and patterning the aluminum film by the known photolithography technique and etching technique. After the interconnections 104a and 104b are formed in this manner, an interlayer dielectric film 105 is formed on the insulating film 103 to cover the interconnections by, e.g., CVD.

Subsequently, the resultant structure is patterned by the known photolithography technique and etching technique, so that through holes 106a and 106b that reach predetermined portions on the interconnections 104a and 104b are formed in the interlayer dielectric film 105. After that, a metal film made of TiW is formed by sputtering on the interlayer dielectric film 105 including the surfaces of the interconnections 104a and 104b exposed to the bottoms of the through holes 106a and 106b.

Subsequently, the metal film is patterned by the known photolithography technique and etching technique, to form sensor electrodes 107 and connection electrode films 108. For example, a resist pattern is formed on the prospective sensor electrode 107 regions and the prospective connection electrode film 108 regions on the 0.2-µm thick metal film. The metal film is selectively etched by dry etching such as, e.g., reactive ion etching, using the resist pattern as a mask. Thus, the sensor electrodes 107 and connection electrode films 108 can be formed. The material of the metal film is not limited to TiW, but a conductive material such as Ti, TiN, or Cr, or a material as a combination of them can be used to form the metal film. This process is the same as in the method of manufacturing the surface shape recognition sensor described with reference to FIGS. 1A to 1E.

As shown in FIG. 3B, a passivation film 309 is formed on the interlayer dielectric film 105 to cover the sensor electrodes 107 and connection electrode films 108. The passivation film 309 may be formed by depositing silicon nitride to a thickness of about 0.2 µm by, e.g., plasma CVD. After the passivation film 309 is deposited, through holes 309a that extend through the passivation film 309 and reach the connection electrode films 108 are formed at predetermined portions on the connection electrode films 108.

As shown in FIG. 3C, a metal film 310 made of Cr/Au is formed on the passivation film 309 including the interiors of the through holes 309a by, e.g., vapor deposition. The metal film 310 has a lower Cr film with a thickness of 0.1 µm and an upper Au film with a thickness of about 0.1 µm. If the Au film is directly formed on the passivation film 309, very high adhesion properties cannot be obtained. The Cr film is a material that has high adhesion properties with respect to a passivation film and a gold film.

Therefore, when the Cr film is interposed, the Au film can be formed on the passivation film 309 in a stable state. The presence of the Cr film can suppress diffusion of Au. In place of Cr, a metal, e.g., Ti or Ni, that can suppress diffusion of Au and provide good adhesion properties with respect to the passivation film and Au may be used.

After the metal film 310 is formed, a resist pattern 311 having a grid-like planar shape (opening), in which the sensor electrodes 107 are arranged at the centers of the respective cells, is formed by the known photolithography technique. The resist pattern 311 is formed to a thickness of about 5 μm. Subsequently, Au is grown for about 3 μm by electrolytic plating on the surface of the metal film 310 exposed to the groove bottom of the resist-pattern 311, to form an electrode column 312. Alternatively, an electrode column may be formed by plating copper. The technique for forming the electrode column 312 is not limited to electrolytic plating, but gold or copper may be grown by electroless plating to form the electrode column 312. After the electrode column 312 is formed, the resist pattern 311 is removed.

As shown in FIG. 3D, the metal film 310 is selectively etched using the electrode column 312 as a mask. To etch the metal film 310, first, the upper Au film is removed by a wet process using an aqueous solution mixture containing iodine, ammonium iodide, and ethanol as an etching solution. Subsequently, the lower Cr film is removed by a wet process using an aqueous solution of potassium ferricyanide and sodium hydroxide as an etching solution.

As the consequence of these etching processes, a ground electrode formed of that part of the metal film 310 which is left by etching and the electrode column 312 is formed on the passivation film 309. The ground electrode (electrode column 312) is connected to ground of the underlying integrated circuits through the interconnections 104b. For example, when a finger comes into contact with the ground electrode, static electricity generated on the surface of protection films 313 (to be described hereinafter) can be discharged to ground.

After that, as shown in FIG. 3E, the protection films 313 made of polyimide are formed on the passivation film 309 to fill the side portion of the ground electrode formed of the grid-like electrode column 312.

Formation of the protection films 313 will be described in more detail. First, a polyimide material is applied to the passivation film 309 by, e.g., spin coating, to form a polyimide film. The polyimide film is formed thick such that it covers the electrode column 312 and absorbs the three-dimensional pattern on the passivation film 309 to make a substantially flat surface. As the polyimide material, for example, a polyimide resin containing a polybenzaoxazol precursor as the base can be used. After the polyimide film is formed by coating, it is heated to about 310° C. to be thermoset.

Subsequently, the polyimide film which is set is etched back to expose the upper surface of the electrode column 312, so that the protection films 313 are formed to make a flat surface. Etching back may be performed by, e.g., dry etching using an oxygen gas plasma. As polyimide is an organic material, it can be etched by the oxygen gas plasma. Alternatively, etching back may be performed by chemical mechanical polishing. As the electrode column 312 is made of Au, it provides good adhesion properties with the polyimide resin film. Even when the electrode column 312 is-polished by chemical mechanical polishing, the resin film can hardly peel off at the electrode column 312 portion.

As described above, according to this embodiment, the sensor electrodes 107 are formed such that they are connected to the integrated circuits, e.g., sensor circuits, formed on the semiconductor substrate 101 through the interconnections, or successively after the integrated circuits are manufactured.

The protection films 313 may be formed using photosensitive polyimide. This case will be described. First, a photosensitive polyimide material is applied by spin coating or the like to the passivation film 309 having the electrode column 312, thus forming a polyimide film. As the material of the polyimide film, for example, a photosensitive polyimide resin containing a polybenzaoxazol precursor as the base was used. The polyimide film is formed to cover the electrode column 312 so that it absorbs unevenness on the passivation film 309.

An opening is formed in the polyimide film on the electrode column 312 by photolithography, and the resultant structure is heated to 310° C. so as to be thermoset. Then, the protection films 313 having flat surfaces and made of polyimide can be formed to fill the cells of the sensor electrodes defined by the grid-like electrode column 312.

The ground electrode is a structure having a grid-like planar shape in which the sensor electrodes 107 are arranged at the centers of the cells. In the ground electrode, for example, the inside of each cell forms a substantial square with sides each being about 100-μm long. The sensor electrode 107 arranged at the center of each cell is a square with sides each being, e.g., 80-μm long.

The ground electrode has 300×300 cells. Accordingly, 300×300 sensor electrodes 107 are arranged in a matrix to form the detection surface of the sensor chip.

The ground electrode is not limited to a grid-like one, but may form separate portions on the surfaces of the protection films 313, e.g., on one side of the circumference of each sensor electrode 107. Even when the ground electrode has separate portions on the surfaces of the protection films 313, the separate portions of the ground electrode are connected to each other through interconnections such as the interconnections 104b, so the whole ground electrode has the same potential.

The ground electrode may be formed for each one of the plurality of sensor electrodes 107. If the ground electrode is formed like a grid and the sensor electrodes 107 are arranged at the centers of the respective cells, the distances between the respective sensor electrodes and the ground electrode become equal.

As has been described above, according to the present invention, the sensor electrodes and ground electrode are formed by patterning the metal film, so that they do not cause electrostatic breakdown due to the static electricity generated during sensing. Hence, a surface shape recognition sensor that can detect the surface shape stably and with a high sensitivity and high reliability can be manufactured easily, which is an excellent effect.

What is claimed is:

1. A method of manufacturing a surface shape recognition sensor, comprising the steps of:
   forming first and second interconnections on a semiconductor substrate;
   forming an interlayer dielectric film on the semiconductor substrate to cover the first and second interconnections;
   forming a first metal film of one material selected from the group consisting of TiW, Ti, TiN, Cr, and a composite film thereof, on the interlayer dielectric film and electrically connected to the first and second interconnections through first and second through holes formed in the interlayer dielectric film;

forming a first mask pattern on the first metal film to cover predetermined first and second regions corresponding to openings of the first and second through holes, respectively;

selectively removing the first metal film exposed to a bottom of the opening of the first mask pattern to form a sensor electrode and connection electrode film, formed of the first metal film connected to the first and second interconnections, in the first and second regions, respectively;

forming a passivation film made of an insulating material on the interlayer dielectric film, the sensor electrode and the connection electrode film;

forming a third through hole in the passivation film to reach the connection electrode film;

forming a second metal film on the passivation film to be in contact with the connection electrode film exposed to a bottom of the third through hole;

forming, on the second metal film, a second mask pattern having a pattern portion on a predetermined region including the third through hole excluding a region corresponding to the sensor electrode; and selectively removing the second metal film using the second mask pattern as a mask to form a ground electrode to be connected to the second interconnection through the connection electrode film.

2. A method of manufacturing a surface shape recognition sensor, comprising the steps of:

forming first and second interconnections on a semiconductor substrate;

forming an interlayer dielectric film on the semiconductor substrate to cover the first and second interconnections;

forming a first metal film to be electrically connected to the first and second interconnections through first and second through holes formed in the interlayer dielectric film;

forming a first mask pattern on the first metal film to cover predetermined first and second regions corresponding to openings of the first and second through holes, respectively;

selectively removing the first metal film exposed to a bottom of the opening of the first mask pattern to form a sensor electrode and connection electrode, formed of the first metal film connected to the first and second interconnections, in the first and second regions, respectively;

forming a passivation film made of an insulating material on the interlayer dielectric film to cover the sensor electrode and the connection electrode film;

forming a third through hole in the passivation film to reach the connection electrode film;

forming a second metal film on the passivation film to be in contact with the connection electrode film exposed to a bottom of the third through hole;

forming, on the second metal film, a second mask pattern having a groove on a predetermined region including an upper region of the third through hole excluding a region corresponding to the sensor electrode;

selectively growing a metal film on a surface of the second metal film exposed to a bottom of the groove of the second mask pattern to form an electrode column; and removing the second mask pattern, and thereafter removing the second metal film excluding a lower region of the electrode column to form a ground electrode which is formed of the electrode column and a remainder of the second metal film and to be connected to the second interconnection through the second and third through holes.

3. A method according to claim 2, wherein the first metal film is made of one material selected from the group consisting of TiW, Ti, TiN, Cr, and a composite film thereof.

4. A method according to claim 2, wherein the electrode column is made of one of Au and Cu.

5. A method of manufacturing a surface shape recognition sensor, comprising the steps of:

forming first and second interconnections on a semiconductor substrate;

forming an interlayer dielectric film on the semiconductor substrate to cover the first and second interconnections;

forming a first metal film to be electrically connected to the first and second interconnections through first and second through holes formed in the interlayer dielectric film;

forming a first mask pattern on the first metal film to cover predetermined first and second regions corresponding to openings of the first and second through holes, respectively;

selectively removing the first metal film exposed to a bottom of the opening of the first mask pattern to form a sensor electrode and connection electrode, formed of the first metal film connected to the first and second interconnections, in the first and second regions, respectively;

forming a passivation film made of an insulating material on the interlayer dielectric film to cover the sensor electrode and the connection electrode film;

forming a third through hole in the passivation film to reach the connection electrode film;

forming a second metal film on the passivation film to be in contact with the connection electrode film exposed to a bottom of the third through hole;

forming, on the second metal film, a second mask pattern having a groove on a predetermined region including an upper region of the third through hole excluding a region corresponding to the sensor electrode;

selectively growing a metal film on a surface of the second metal film exposed to a bottom of the groove of the second mask pattern to be thicker than the sensor electrode to form an electrode column;

removing the second mask pattern, and thereafter removing the second metal film excluding a lower region of the electrode column to form a ground electrode which is formed of the electrode column and a remainder of the second metal film and to be connected to the second interconnection through the second and third through holes; and forming a protection film on the passivation film so as to cover a side portion of the electrode column with part of an upper surface of the electrode column being exposed.

6. A method according to claim 5, wherein the first metal film is made of one material selected from the group consisting of TiW, Ti, TiN, Cr, and a composite film thereof.

7. A method according to claim 5, wherein the electrode column is made of one of Au and Cu.

8. A method according to claim 5, wherein the passivation film is made of silicon nitride.

9. A method according to claim 5, wherein the protection film is made of polyimide.

10. A method according to claim 9, wherein polyimide is made of polybenzaoxazol.

11. A method of manufacturing a surface shape recognition sensor, comprising the steps of:

forming first and second interconnections on a semiconductor substrate;

forming an interlayer dielectric film on the semiconductor substrate to cover the first and second interconnections;

forming a first composite metal film including at least one material selected from the group consisting of TiW, Ti, TiN, and Cr, on the interlayer dielectric film and electrically connected to the first and second interconnections through first and second through holes formed in the interlayer dielectric film;

forming a first mask pattern on the first metal film to cover predetermined first and second regions corresponding to openings of the first and second through holes, respectively;

selectively removing the first metal film exposed to a bottom of the opening of the first mask pattern to form a sensor electrode and connection electrode film, formed of the first metal film connected to the first and second interconnections, in the first and second regions, respectively;

forming a passivation film made of an insulating material on the interlayer dielectric film, the sensor electrode and the connection electrode film;

forming a third through hole in the passivation film to reach the connection electrode film;

forming a second metal film on the passivation film to be in contact with the connection electrode film exposed to a bottom of the third through hole;

forming, on the second metal film, a second mask pattern having a pattern portion on a predetermined region including the third through hole excluding a region corresponding to the sensor electrode; and selectively removing the second metal film using the second mask pattern as a mask to form a ground electrode to be connected to the second interconnection through the connection electrode film.

* * * * *

UNITED STATES PATENT AND TRADEMARK OFFICE
CERTIFICATE OF CORRECTION

PATENT NO. : 7,045,379 B2  Page 1 of 1
APPLICATION NO. : 10/385532
DATED : May 16, 2006
INVENTOR(S) : Tanabe et al.

Figure 4B:
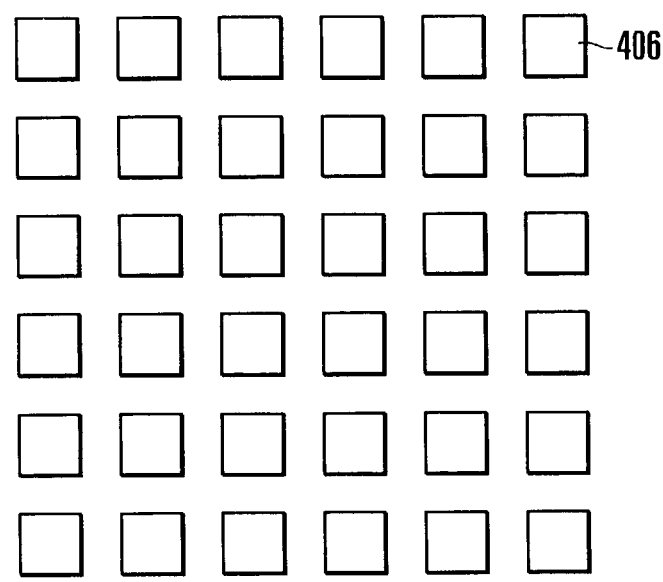

It is certified that error appears in the above-identified patent and that said Letters Patent is hereby corrected as shown below:

In the Drawings, Figures 4A and 4B, please include the words -- PRIOR ART --.

Signed and Sealed this

Eleventh Day of September, 2007

JON W. DUDAS
*Director of the United States Patent and Trademark Office*